United States Patent
Zhou et al.

(10) Patent No.: US 9,467,413 B2
(45) Date of Patent: Oct. 11, 2016

(54) METHOD AND SYSTEM FOR REPLYING TO WEBSITE UPDATE EVENT

(71) Applicant: TENCENT TECHNOLOGY (SHENZHEN) COMPANY LIMITED, Shenzhen, Guangdong Province (CN)

(72) Inventors: Xuan Zhou, Shenzhen (CN); Xin Xu, Shenzhen (CN); Shuzhan Yang, Shenzhen (CN); Jianing Tang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 174 days.

(21) Appl. No.: 14/311,177

(22) Filed: Jun. 20, 2014

(65) Prior Publication Data

US 2014/0304349 A1    Oct. 9, 2014

Related U.S. Application Data

(63) Continuation of application No. PCT/CN2012/087538, filed on Dec. 26, 2012.

(30) Foreign Application Priority Data

Dec. 27, 2011 (CN) .......................... 2011 1 0444057

(51) Int. Cl.
*G06F 15/16* (2006.01)
*H04L 12/58* (2006.01)

(52) U.S. Cl.
CPC .............. *H04L 51/32* (2013.01); *H04L 51/04* (2013.01)

(58) Field of Classification Search
None
See application file for complete search history.

(56) References Cited

U.S. PATENT DOCUMENTS

2002/0026520 A1   2/2002  Mendiola et al.
2007/0143417 A1*  6/2007  Daigle ................. G06Q 10/107
                                                      709/206

(Continued)

FOREIGN PATENT DOCUMENTS

CN   1653781 A   8/2005
CN   1829202 A   9/2006

(Continued)

OTHER PUBLICATIONS

Tetsu Yamato, "Introducing Online Software for More Comfortable Broadband! Enchanted Net Tools", PC Japan, Jul. 2005, pp. 144-147, vol. 10, Issue 7, Softbank Publishing Corp., Japan.

*Primary Examiner* — Wing F Chan
*Assistant Examiner* — Padma Mundur
(74) *Attorney, Agent, or Firm* — Cheng-Ju Chiang

(57) ABSTRACT

A method for replying to a website update event includes steps of: receiving, at an instant-messaging client end, prompting information about an update event of personal dynamic information of a user account associated with a current user at the instant-messaging client end in an SNS, wherein the prompting information includes information of prompting the user to conduct a reply; loading and rendering, at the instant-messaging client end, the updated personal dynamic information when the instant-messaging client end receives command information corresponding to the information of prompting the user to conduct a reply; and generating and outputting, at the instant-messaging client end, a reply window according to the loaded and rendered updated personal dynamic information and thereby enabling the user at the instant-messaging client end to conduct a reply through the reply window. A system for replying to a website update event is also provided.

8 Claims, 4 Drawing Sheets

(56) References Cited

U.S. PATENT DOCUMENTS

| | | | |
|---|---|---|---|
| 2009/0327437 A1* | 12/2009 | Estrada | H04L 12/587 709/206 |
| 2012/0215871 A1* | 8/2012 | Zhang | G06Q 30/0269 709/206 |
| 2012/0324396 A1* | 12/2012 | Baartman | G06F 9/4443 715/788 |

FOREIGN PATENT DOCUMENTS

| | | |
|---|---|---|
| CN | 101026592 A | 8/2007 |
| CN | 101072103 A | 11/2007 |
| CN | 101562581 A | 10/2009 |
| CN | 101694660 A | 4/2010 |
| JP | 2007-58740 A | 3/2007 |
| JP | 2007-199819 A | 8/2007 |
| JP | 2008-85681 A | 4/2008 |
| JP | 2008-146422 A | 6/2008 |
| JP | 2009-177617 A | 8/2009 |
| JP | 2011-40071 A | 2/2011 |
| JP | 2011-516938 A | 5/2011 |
| JP | 2011-519437 A | 7/2011 |
| JP | 2013-545199 A | 12/2013 |
| WO | 2010/117887 A2 | 10/2010 |
| WO | 2013/097721 A1 | 7/2013 |

* cited by examiner

```
┌─────────────────────────────────────────────────────────────────┐
│ receive, at an instant-messaging client end, prompting information about │
│   an update event of personal dynamic information of a user account     │
│ associated with a current user of the instant-messaging client end in an SNS │
└─────────────────────────────────────────────────────────────────┘
                                  │
                                  ▼                        S101
┌─────────────────────────────────────────────────────────────────┐
│ load and render, at the instant-messaging client end, the updated personal │
│    dynamic information when the instant-messaging client end receives    │
│         command information corresponding to the information of         │
│                  prompting the user to conduct a reply                  │
└─────────────────────────────────────────────────────────────────┘
                                  │
                                  ▼                        S102
┌─────────────────────────────────────────────────────────────────┐
│  generate and output, at the instant-messaging client end, a reply window │
│ according to the loaded and rendered updated personal dynamic information │
│ and thereby enabling the user at the instant-messaging client end to conduct │
│                    a reply through the reply window                    │
└─────────────────────────────────────────────────────────────────┘
                                                           S103
```

FIG. 1

```
┌─────────────────────────────────────────────────────┐
│ Tencent Friends                                     │
│  ┌──────┐ Zhang                                     │
│  │User 1│ Xiaochen                                  │
│  └──────┘                                           │
│                                                     │
│         ┌──────┐ Xie Yan:I found an old frien on Tencent Friends! │
│         │User 2│                                    │
│         └──────┘ 11:23  post                        │
│                  ┌─────────────────────────────┐    │
│                  │ Great!                      │    │
│                  │                             │    │
│                  │ ┌──────┐ ┌──────┐           │    │
│                  │ │Submit│ │Cancel│           │    │
│                  │ └──────┘ └──────┘           │    │
│                  └─────────────────────────────┘    │
│                                              21     │
└─────────────────────────────────────────────────────┘
```

FIG. 2

METHOD AND SYSTEM FOR REPLYING TO WEBSITE UPDATE EVENT

CROSS-REFERENCE TO RELATED APPLICATION

This application is a continuation application of International (PCT) Patent Application No. PCT/CN2012/087538 filed on Dec. 26, 2012, now pending and designating the United States, which also claims benefit of China Patent Application No. 201110444057.7, filed on Dec. 27, 2011. The entireties of the above-mentioned patent applications are hereby incorporated by reference herein and made a part of this specification.

FIELD OF THE TECHNOLOGY

The present invention relates to a network communication technical field, and more particularly to method and system for replying to a website update event.

BACKGROUND

With the development of network technology, various social networking sites (SNSs) are developed, for example, Tencent Friends, Renren, Kaixin websites, etc. Due to being capable of meeting various needs of users, such as entertainments and communications between friends, SNSs have become one of the most important communication tools and media in people's daily lives. However, the existing SNSs still have some functions required to be improved. For example, if a user posts a log, a photo, a message or a shared material in an SNS, and another user comments on or replies to the post in the SNS, the commented user will be informed of the comment or reply by way of client software. The commented user then needs to activate an additional browser and an additional webpage and find the corresponding contents to conduct a reply to the comment or reply.

According to the existing technical solutions, it is found that the existing technology has the following technical problem. To reply to updated contents in an SNS, a user needs to activate an additional browser and an additional webpage and find the corresponding contents before he could conduct a reply to the comment or reply. Since the reply might be made late, a problem of relatively weak interaction might be caused.

SUMMARY

An objective of an embodiment of the present invention is to provide method and system for replying to a website update event, thereby solving problems of possible late reply and relatively weak interaction, which are caused by the fact that a user needs to activate an additional browser and an additional webpage and find the corresponding contents before he could conduct a reply to updated contents in a social networking site (SNS).

An embodiment of the present invention provides a method for replying to a website update event, which is executed by a digital data processing device, including steps of:

receiving, at an instant-messaging client end, prompting information about an update event of personal dynamic information of a user account associated with a current user of the instant-messaging client end in an SNS, wherein the prompting information includes information of prompting the user to conduct a reply;

loading and rendering, at the instant-messaging client end, the updated personal dynamic information when the instant-messaging client end receives command information corresponding to the information of prompting the user to conduct a reply; and generating and outputting, at the instant-messaging client end, a reply window according to the loaded and rendered updated personal dynamic information and thereby enabling the user at the instant-messaging client end to conduct a reply through the reply window.

Another embodiment of the present invention provides a system for replying to a website update event, which includes:

an information receiving unit configured for receiving, at an instant-messaging client end, prompting information about an update event of personal dynamic information of a user account associated with a current user of the instant-messaging client end in an SNS, wherein the prompting information includes information of prompting the user at the instant-messaging client end to conduct a reply;

a loading unit configured for loading and rendering, at the instant-messaging client end, the updated personal dynamic information when the instant-messaging client end receives command information corresponding to the information of prompting the user to conduct a reply; and an output unit configured for generating and outputting, at the instant-messaging client end, a reply window according to the loaded and rendered updated personal dynamic information and thereby enabling the user at the instant-messaging client end to conduct a reply through the reply window In the present embodiments, prompting information about an update event of personal dynamic information of a user account associated with a current user of an instant-messaging client end in an SNS is received at the instant-messaging client end, wherein the prompting information includes information of prompting the user to conduct a reply; the updated personal dynamic information is loaded and rendered at the instant-messaging client end when the instant-messaging client end receives command information corresponding to the information of prompting the user to conduct a reply; and a reply window is generated and outputted at the instant-messaging client end according to the loaded and rendered updated personal dynamic information and thereby enabling the user at the instant-messaging client end to conduct a reply through the reply window. The invention makes a prompt reply feasible without opening the corresponding webpage. Accordingly, prompt interaction and timely communication can be made. In this manner, when a user would like to conduct a reply to an updated personal dynamic information in an SNS website, the reply can be made without activating an additional browser and an additional webpage to find the corresponding contents

BRIEF DESCRIPTION OF THE DRAWINGS

The above embodiments will become more readily apparent to those ordinarily skilled in the art after reviewing the following detailed description and accompanying drawings, in which:

FIG. 1 is a flowchart illustrating a method for replying to a website update event in accordance with a first embodiment of the present invention;

FIG. 2 is a simplified schematic diagram of a printed screen exemplifying information entered by a user at another instant-messaging client end in the SNS;

DETAILED DESCRIPTION OF PREFERRED EMBODIMENTS

Figure 3:
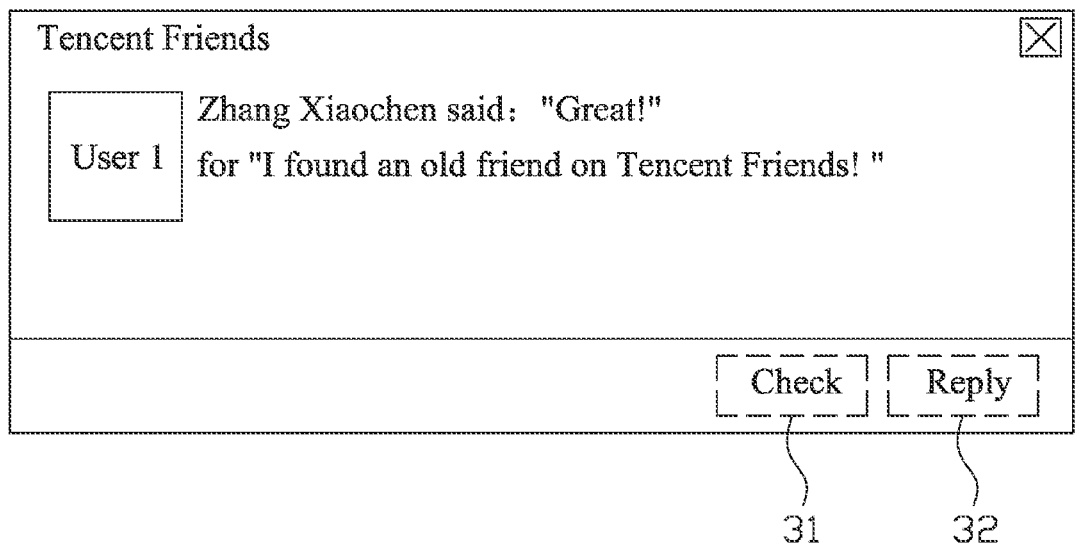
FIG. 3 is a simplified schematic diagram of a printed screen exemplifying a prompting window corresponding to the information as shown in FIG. 2 according to the first embodiment of the present invention.

For illustrating the objectives, technical means and advantages of the present invention in a clearer way, the present invention is described with reference to the drawings and embodiments. It is to be understood that the embodiments are used for illustrating the present invention rather than limiting the present invention.

The present invention receives, at an instant-messaging client end, prompting information about an update event of personal dynamic information of a user account associated with a current user of the instant-messaging client end in a social networking site (SNS), loads and renders the updated personal dynamic information, and generates and outputs a reply window according to the loaded and rendered updated personal dynamic information and thereby enabling the user at the instant-messaging client end to conduct a reply through the reply window. Accordingly, prompt interaction and timely communication can be made by replying in real time without activating a webpage.

A method for replying to a website update event, which includes steps of:

receiving, at an instant-messaging client end, prompting information about an update event of personal dynamic information of a user account associated with a current user of the instant-messaging client end in an SNS, wherein the prompting information includes information of prompting the end user to conduct a reply;

loading and rendering, at the instant-messaging client end, the updated personal dynamic information when the instant-messaging client end receives command information corresponding to the information of prompting the user to conduct a reply; and generating and outputting, at the instant-messaging client end, a reply window according to the loaded and rendered updated personal dynamic information and thereby enabling the user to conduct a reply through the reply window An embodiment of the present invention further provides a system for replying to a website update event, which includes:

an information receiving unit configured for receiving, at an instant-messaging client end, prompting information about an update event of personal dynamic information of a user account associated with of a current user of the instant-messaging client end in an SNS, wherein the prompting information includes information of prompting the user at the instant-messaging client end to conduct a reply;

a loading unit configured for loading and rendering, at the instant-messaging client end, the updated personal dynamic information when the instant-messaging client end receives command information corresponding to the information of prompting the user to conduct a reply; and an output unit configured for generating and output, at the instant-messaging client end, a reply window according to the loaded and rendered updated personal dynamic information and thereby enabling the user to conduct a reply through the reply window.

The implementation of the present invention will be described in detail with the following embodiments.

First Embodiment

In an exemplary scenario, prompting information about an update event of personal dynamic information of a user account associated with a current user of the instant-messaging client end in an SNS is outputted to the user when the prompting information is received at the instant-messaging client end. The prompting, for example, can be made through a prompting window with a reply option. A reply window, in response to the activation of the reply option, pops up so that the user may conduct a reply for the updated event through the reply window. FIG. 1 schematically illustrates the method for replying to a website update event in accordance with the first embodiment of the present invention.

In step S101, the method receives, at an instant-messaging client end, prompting information about an update event of personal dynamic information of a user account associated with a current user of the instant-messaging client end in an SNS, wherein the prompting information includes information of prompting the user to conduct a reply.

In this embodiment, the instant-messaging client end, at which the prompting information about an update event of personal dynamic information of a user account associated with a current user of the instant-messaging client end in an SNS is received, is a QQ client end.

In this embodiment, the update event is, for example, a log update, photo album update, conversation update or share update event posted by the user account in the SNS.

In this embodiment, in addition to the information for prompting the user about the update event of personal dynamic information in the SNS, the prompting information further includes information for prompting the user about how to conduct a reply to the updated event. Specifically, step S102 will be executed if the user decides to conduct the reply by activating the reply option; and on the other hand, the prompting information can be ignored, hidden or deleted if no further operation is performed.

In step S102, the method loads and renders, at the instant-messaging client end, the updated personal dynamic information when the instant-messaging client end receives command information corresponding to the information of prompting the user to conduct a reply.

In this embodiment, the updated dynamic personal messages can be loaded and rendered at a backend of the instant-messaging client end; and thus, the user may have a better user experience without awareness of the process of loading and rendering the updated dynamic personal information.

Subsequently in step S103, the method generates and outputs, at the instant-messaging client end, a reply window according to the loaded and rendered updated personal dynamic information in response to the activation of the reply option in step S102, and thereby enabling the user at the instant-messaging client end to conduct a reply through the reply window.

In this embodiment, the user at the instant-messaging client end may conduct a reply through the reply window, which is generated according to the loaded and rendered updated dynamic personal information, without activating and logging into the SNS.

Figure 4:
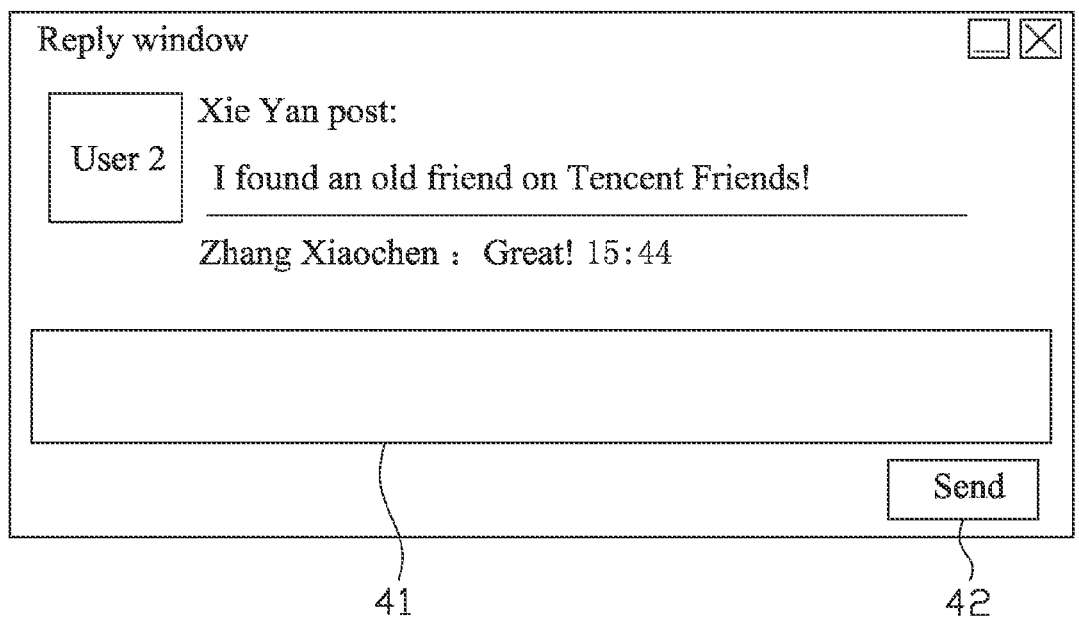
FIG. 4 is a simplified schematic diagram of a printed screen exemplifying a reply window derived from the prompt window as shown in FIG. 3 according to the first embodiment of the present invention.

To facilitate the understanding of the embodiment, the operations at the instant-messaging client end of the present invention will be described hereinafter with a specific example, but the feature of the present invention is not limited thereto. Take the SNS "Tencent Friends" as an example. FIG. 2 illustrates a case that a user "Zhang Xiaochen" (User 1 at a first instant-messaging client end) types literal conversation in a dialogue block 21 to be transmitted to a user "Xieyan" (User 2 at a second instant-messaging client end) via the "Tencent Friends" web site. In response to the success transmission of the literal conversation, an external object, e.g. a software program executed in the computer or equivalent digital data processing device of User 2, at the second instant-messaging client end executes step S101 of the method to receive relevant information. The information may optionally be displayed as a prompting window as illustrated in FIG. 3 on a display of the external object. The prompting window includes a "Check" virtual button 31 and a "Reply" virtual button 32, either of which may be selectively activated by User 2. If User 2 enters command information by clicking on the "Reply" button 32 in the prompting window, the second instant-messaging client end will execute step S102 and then step S103 to load and render the updated personal dynamic information, and generate and output a reply window as illustrated in FIG. 4. Thus, User 2 may reply User 1 by typing in a dialogue block 41 of the reply window, and then clicks on the "Send" virtual button 42 to accomplish a reply without logging into the SNS.

In this embodiment, the method for replying to a website update event receives, at the instant-messaging client end, prompting information about an update event of personal dynamic information of a user account associated with a current user at the instant-messaging client end in an SNS, wherein the prompting information includes information of prompting the user to conduct a reply; loads and renders the updated personal dynamic information when the instant-messaging client end receives command information corresponding to the information of prompting the user to conduct a reply; and generates and outputs, at the instant-messaging client end, a reply window according to the loaded and rendered updated personal dynamic information and thereby enabling the user to conduct a reply through the reply window. Accordingly, prompt interaction and timely communication can be made. In this manner, when a user would like to conduct a reply to updated personal dynamic information in an SNS website, the reply can be made without activating an additional browser and an additional webpage to find the corresponding contents.

Second Embodiment

Figure 5:
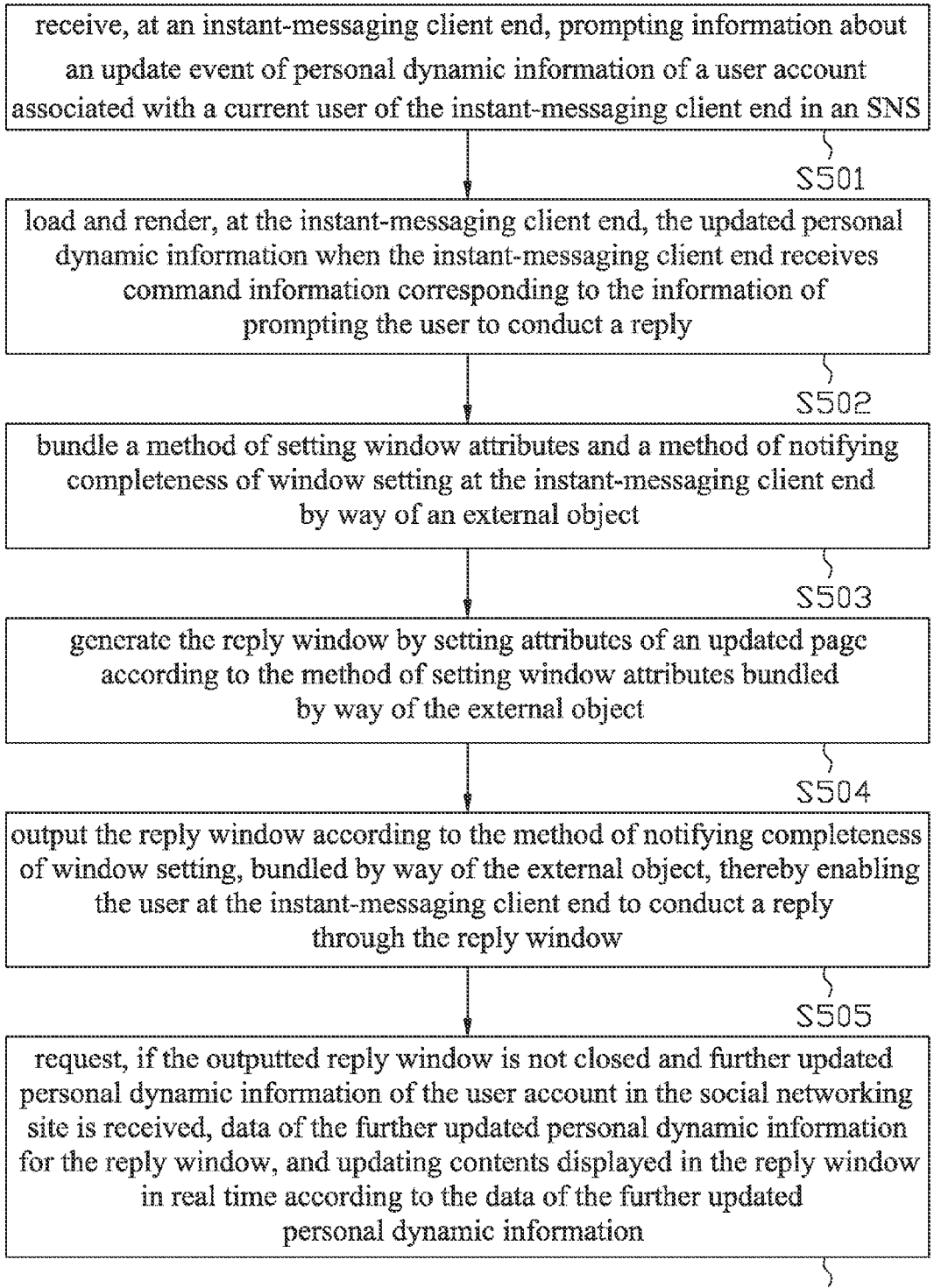
FIG. 5 is a flowchart illustrating a method for replying to a website update event in accordance with a second embodiment of the present invention.

The second embodiment of the present method for replying to a website update event will be described in an exemplary scenario similar to that described in the first embodiment with reference to FIG. 5.

In step S501, the method receives, at an instant-messaging client end, prompting information about an update event of personal dynamic information of a user account associated with a current user of the instant-messaging client end in an SNS, wherein the prompting information includes information of prompting the user to conduct a reply.

In step S502, the method loads and renders, at the instant-messaging client end (the second instant-messaging client end), the updated personal dynamic information when the instant-messaging client end receives command information corresponding to the information of prompting the user to conduct a reply.

In this embodiment, steps S501-S502 are executed in a manner similar to steps S101-S102 in the first embodiment, respectively. Therefore, they are not to be redundantly described herein.

In step S503, the method bundles a method of setting window attributes and a method of notifying completeness of window setting at the instant-messaging client end by way of an external object. The external object, as described as above, can be a software program executed in the computer or equivalent digital data processing device of User 2, at the second instant-messaging client end.

In this embodiment, the method of setting window attributes includes setting the window size, setting the window background color and/or setting the window title.

In step S504, the method generates the reply window by setting attributes of an updated page according to the method of setting window attributes bundled by way of the external object.

In step S505, the method outputs the reply window according to the method of notifying completeness of window setting, bundled by way of the external object, thereby enabling the user at the instant-messaging client end to conduct a reply through the reply window.

In this embodiment, as illustrated in steps S503-S505, the reply window is generated and outputted according to the updated page, thereby enabling the user at the instant-messaging client end to conduct a reply through the reply window. In addition, by incorporating the method of setting a window into the external object at the instant-messaging client end, the updated page is reset to display the reply window, and the user at the instant-messaging client end may conduct a reply through the reply window in a simple and convenient manner without any installation space.

In step S506, if the displayed reply window is not closed and further updated personal dynamic information of the user account in the social networking site is received, the method will request data of the further updated personal dynamic information for the reply window, and update contents displayed in the reply window in real time according to the data of the further updated personal dynamic information.

In this embodiment, if the outputted reply window is not closed, the user at the second instant-messaging client end can keep communicating with the user at the first instant-messaging client end so as to achieve prompt and real-time communication. Meanwhile, in response to the further updated personal dynamic information from the SNS, the method further requests the data of the further updated personal dynamic information for the reply window, and updates contents displayed in the reply window in real time according to the data of the further updated personal dynamic information. Since only the further updated personal dynamic information is requested in this step, the display processing speed would not be adversely affected so as to expect satisfactory user experience.

Third Embodiment

Figure 6:
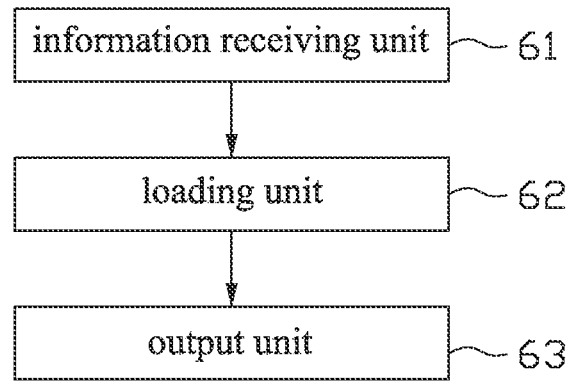
FIG. 6 is a constructional diagram of a system for replying to a website update event in accordance with a third embodiment of the present invention.

FIG. 6 is a constructional diagram of a system for replying to a website update event in accordance with a third embodiment of the present invention. For neat and focusing purpose, only the members associated with the description of this embodiment are illustrated.

The system for replying to a website update event provided by this embodiment of the present invention includes an information receiving unit 61, a loading unit 62 and an output unit 63.

The information receiving unit 61 is configured for receiving, at an instant-messaging client end, prompting information about an update event of personal dynamic information of a user account associated with a current user at the instant-messaging client end in an SNS, wherein the prompting information includes information of prompting a user at the instant-messaging client end to conduct a reply.

In this embodiment, the update event can be a log update event, a photo album update event, a conversation update event and/or a share update event posted in the SNS by another user.

The loading unit 62 is configured for loading and rendering, at the instant-messaging client end, the updated personal dynamic information when the instant-messaging client end receives command information corresponding to the information of prompting the user to conduct a reply.

The output unit 63 is configured for generating and outputting, at the instant-messaging client end, a reply window according to the loaded and rendered updated personal dynamic information and thereby enabling the user at the instant-messaging client end to conduct a reply through the reply window.

The system for replying to a website update event provided in this embodiment of the present invention can be used to execute the corresponding method of the second embodiment. Please refer to the description associated with the second embodiment for detailed information.

Fourth Embodiment

Figure 7:
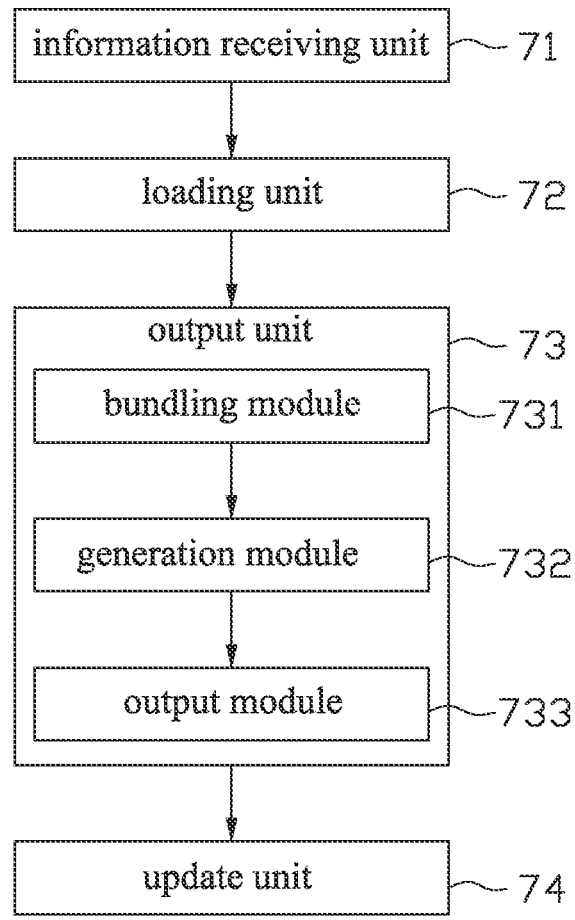
FIG. 7 is a constructional diagram of a system for replying to a website update event in accordance with a fourth embodiment of the present invention.

FIG. 7 is a constructional diagram of a system for replying to a website update event in accordance with a fourth embodiment of the present invention. For neat and focusing purpose, only the members associated with the description of this embodiment are illustrated.

The system for replying to a website update event of this embodiment includes an information receiving unit 71, a loading unit 72 and an output unit 73.

Optionally, the output unit 73 specifically includes a bundling module 731, a generation module 732 and an output module 733.

The bundling module 731 is configured for bundling a method of setting window attributes and a method of notifying completeness of window setting at the instant-messaging client end by way of an external object.

In this embodiment, the method of setting window attributes includes: setting the window size, setting the window background color and/or setting the window title.

The generation module 732 is configured for generating the reply window by setting attributes of the updated page according to the method of setting window attributes bundled by way of the external object.

The output module 733 is configured for outputting the reply window according to the method of notifying completeness of window setting, bundled by way of the external object, thereby enabling the user at the instant-messaging client end to conduct a reply through the reply window.

Optionally, the website updates reply system may also include an update unit 74.

If the displayed reply window is not closed and further updated personal dynamic information from the SNS is received, the update unit 74 requests webpage data for the loaded page, and updates contents displayed in the reply window in real time according to the data of the further updated personal dynamic information.

The system for replying to a website update event provided in this embodiment of the present invention can be used to execute the corresponding method of the second embodiment. Please refer to the description associated with the second embodiment for detailed information.

It is to be noted that each one of the units included in the aforementioned system embodiments is divided by way of functions and logic, and the present invention is not limited thereto if the corresponding functions are achieved; furthermore, the specific names of the functional units are for distinguishing with each other only rather than used for limiting the present invention.

In addition, the ordinary skill in the art can understand that all or part of the steps in the aforementioned method embodiments can be realized by related hardware instructed by programs, the corresponding programs can be stored in a readable storage medium of computer, such as a ROM, RAM, disk or optical disk. etc.

What is described above is preferred embodiments according to the present invention only rather than used for limiting the present invention. On the contrary, it is intended to cover various modifications and similar arrangements included within the spirit and scope of the appended claims which arc to be accorded with the broadest interpretation so as to encompass all such modifications and similar structures.

What is described above is preferred embodiments according to the present invention only rather than used for limiting the present invention. On the contrary, it is intended to cover various modifications and similar arrangements included within the spirit and scope of the appended claims which are to be accorded with the broadest interpretation so as to encompass all such modifications and similar structures.

What is claimed is:

1. A method for replying to a website update event, which is executed by a digital data processing device, comprising steps of:

receiving, at an instant-messaging client end, prompting information about an update event of personal dynamic information of a user account associated with a user at the instant-messaging client end in a social networking site (SNS), wherein the prompting information includes information of prompting the user to conduct a reply;

loading and rendering, at the instant-messaging client end, the updated personal dynamic information when the instant-messaging client end receives command information corresponding to the information of prompting the user to conduct a reply;

bundling setting window attributes and notifying completeness of window setting at the instant-messaging client by an external software program;

generating the reply window by setting attributes of an updated page resulted from an update event in the social networking site according to setting window attributes bundled by the external software program; and outputting the reply window according to notifying completeness of window setting bundled by the external software program, thereby enabling the user at the instant-messaging client to conduct a reply through the reply window.

2. The method according to claim 1, wherein setting window attributes comprises: setting a window size, setting a window background color or setting a window title.

3. The method according to claim 1, wherein after the step of generating and outputting the reply window according to notifying completeness of window setting, bundled by the external software program, thereby enabling the user at the instant-messaging client end to conduct a reply through the reply window, the method further comprises a step of:

requesting, if the outputted reply window is not closed and further updated personal dynamic information of the user account in the social networking site is received, data of the further updated personal dynamic information for the reply window, and updating contents displayed in the reply window in real time according to the data of the further updated personal dynamic information.

4. The method according to claim 1, wherein the update event includes one or more of log update, photo album update, conversation update and share update events.

5. A system for replying to a website update event, comprising one or more processors; a memory; and a plurality of program units stored in the memory and to be executed by the one or more processors, the plurality of program units comprising:

an information receiving unit configured for receiving, at an instant-messaging client end, prompting information about an update event of personal dynamic information of a user account associated with a user at the instant-messaging client end in a social networking site (SNS), wherein the prompting information includes information of prompting the user at the instant-messaging client to conduct a reply;

a loading unit configured for loading and rendering, at the instant-messaging client end, the updated personal dynamic information when the instant-messaging client end receives command information corresponding to the information of prompting the user to conduct a reply; and an output unit configured for generating and outputting, at the instant-messaging client end, a reply window according to the loaded and rendered updated personal dynamic information and thereby enabling the user at the instant-messaging client end to conduct a reply through the reply window, the output unit comprising:

a bundling module configured for bundling setting window attributes and notifying completeness of window setting at the instant-messaging client end by an external software program;

a generation module configured for generating the reply window by setting attributes of an updated page resulted from an update event in the social networking site according to setting window attributes bundled by the external software program; and an output module configured for outputting the reply window according to notifying completeness of window setting, bundled by the external software program, thereby enabling the user at the instant-messaging client end to conduct a reply through the reply window.

6. The system according to claim 5, wherein setting window attributes comprises: setting a window size, setting a window background color or setting a window title.

7. The system according to claim 5, further comprising:

an update unit configured for, if the outputted reply window is not closed and further updated personal dynamic information of the user account in the social networking site is received, requesting data of the further updated personal dynamic information for the reply window, and updating contents displayed in the reply window in real time according to the data of the further updated personal dynamic information.

8. The system according to claim 5, wherein the update event includes one or more of log update, photo album update, conversation update and share update events.

* * * * *